July 31, 1962 L. J. EBNER 3,047,126
HAY BALE CONVEYOR
Filed Dec. 21, 1959 3 Sheets-Sheet 1
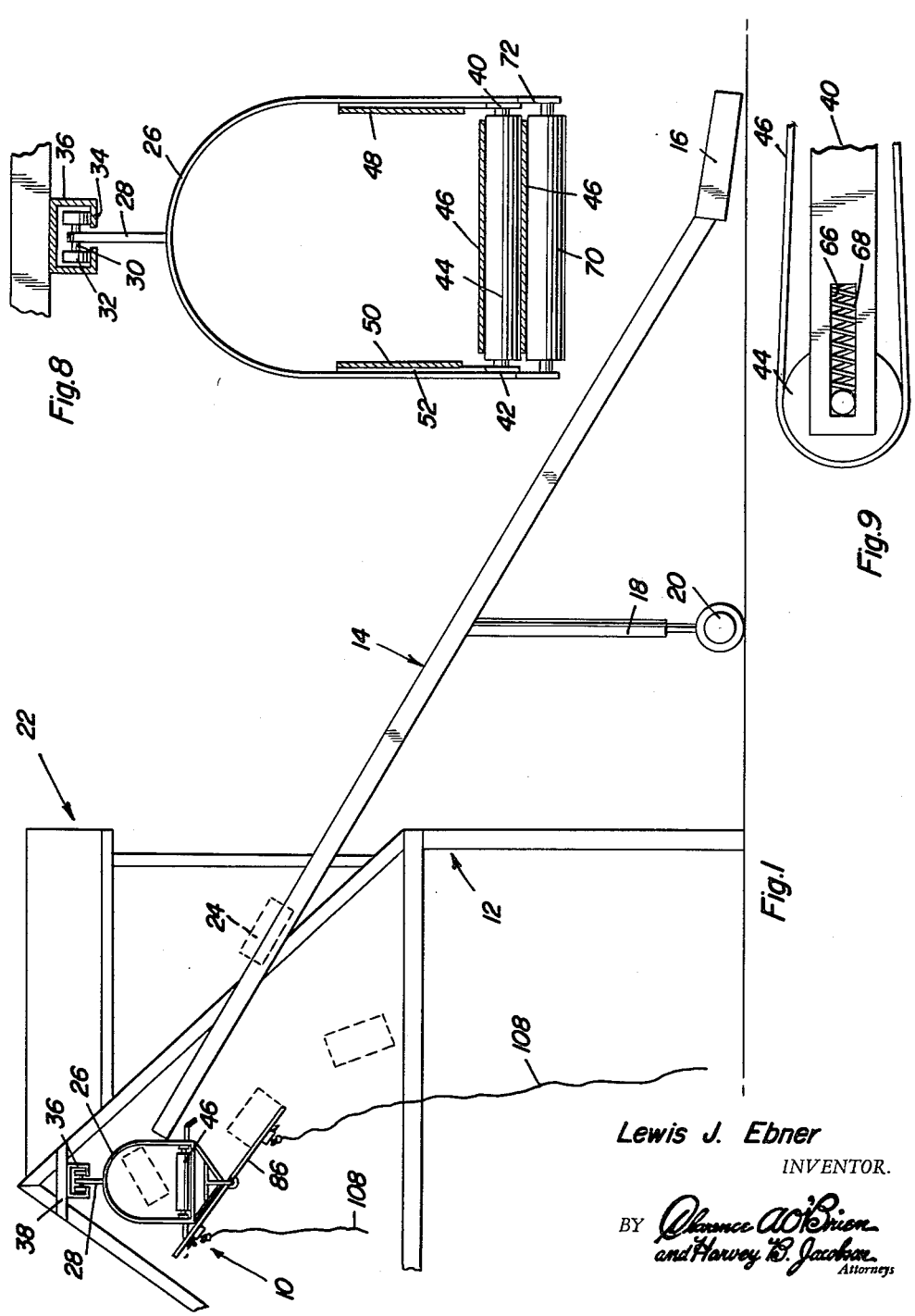
Lewis J. Ebner
INVENTOR.

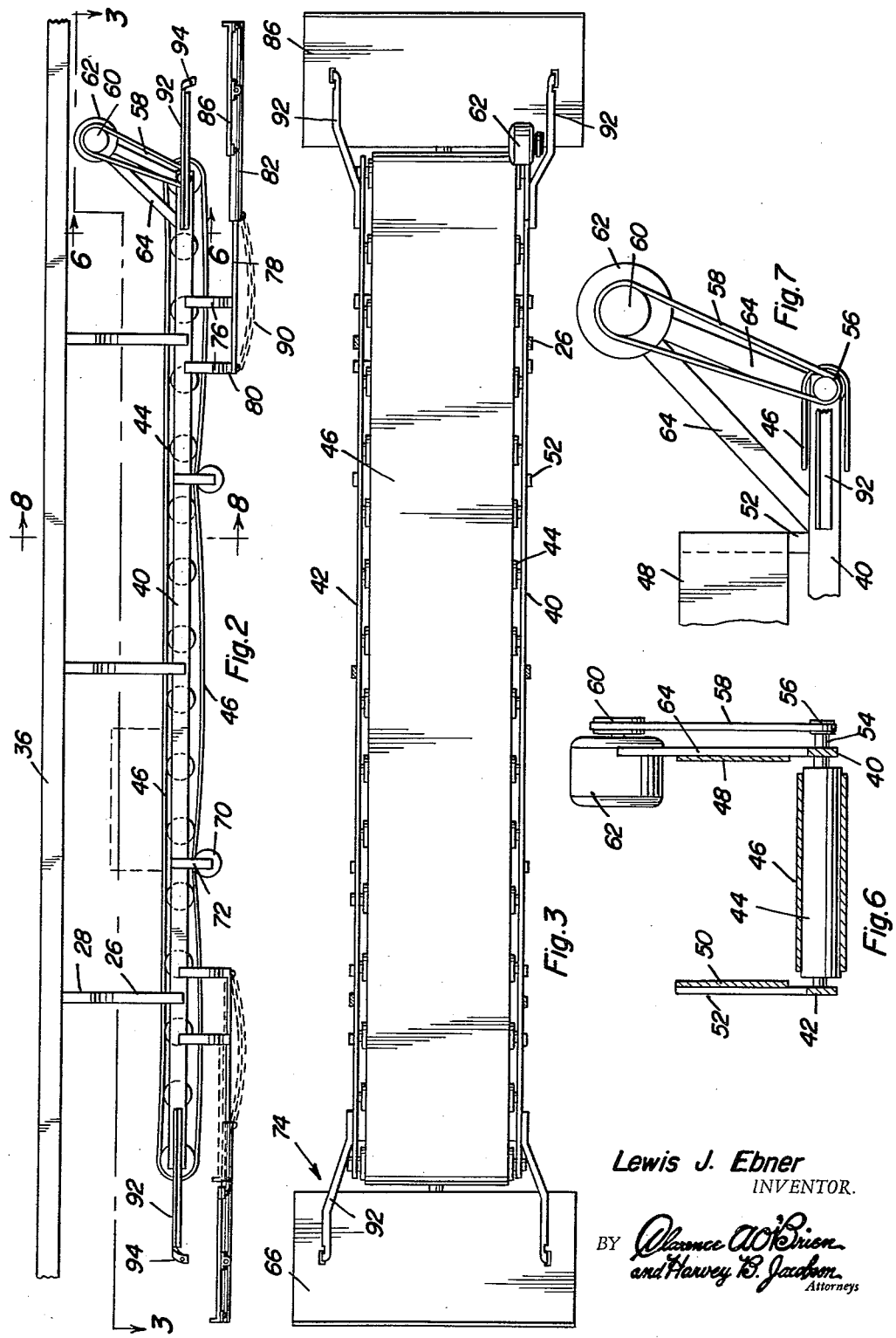

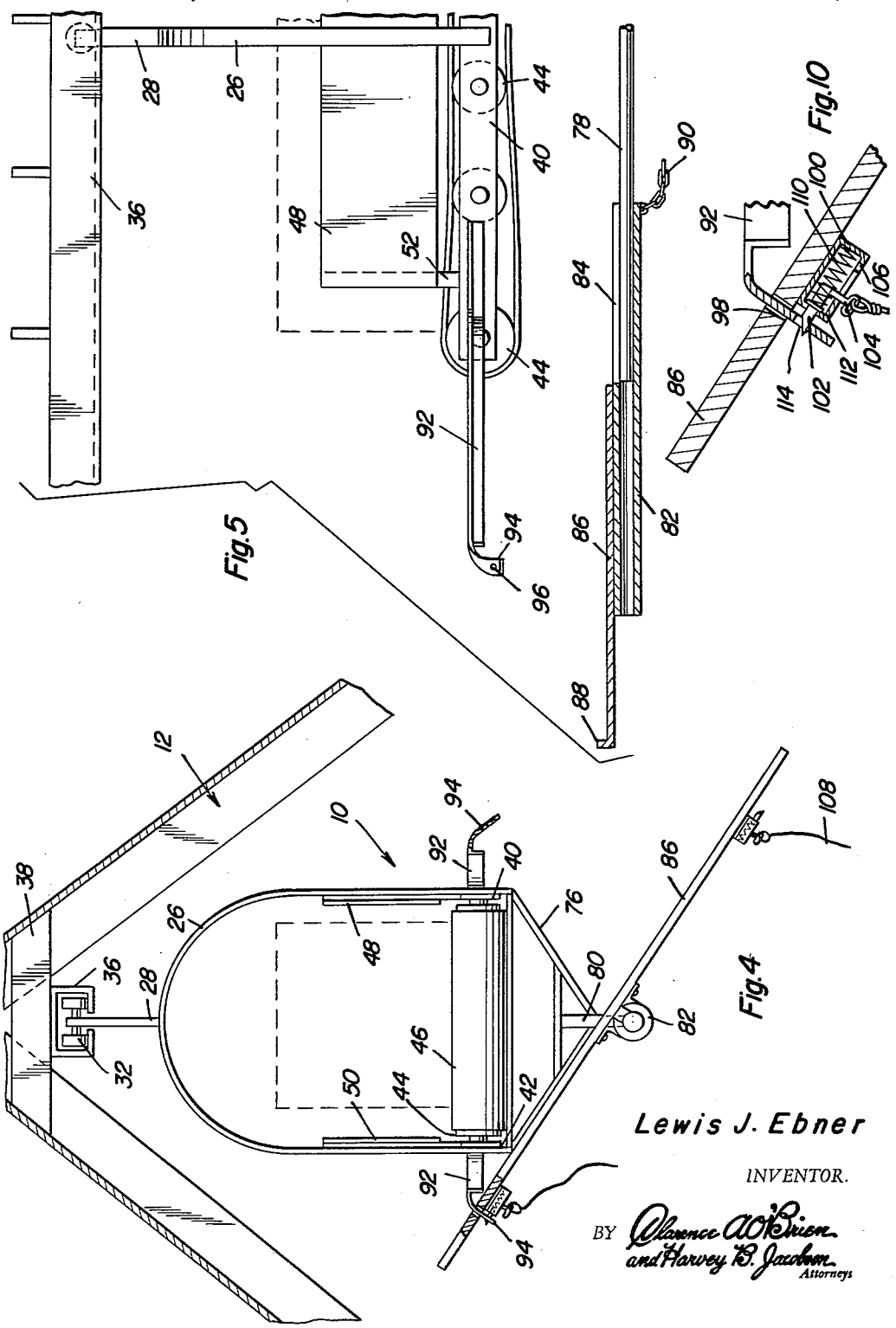

3,047,126
HAY BALE CONVEYOR
Lewis J. Ebner, Lansing, Iowa
Filed Dec. 21, 1959, Ser. No. 861,046
4 Claims. (Cl. 198—68)

The present invention generally relates to a conveyor and more particularly to such a conveyor mounted within a barn or other storage structure for conveying hay bales or similar material to a desired storage area.

In present day harvesting practice, it is the prevailing practice to bale hay while still in the field, collect such bales and transport them to a storage barn. While this overcomes some of the problems existent in handling loose hay, it is still a time consuming and laborious job to store baled hay in the barn since the storage areas are usually in elevated areas of such a barn that are only suitable for storage.

Some endeavor has been made to employ elevators for raising the baled hay from the ground surface to the interior of the barn but the discharge point is stationary and it still requires considerable labor in placing the bales in the desired area. Conventional farm grain conveyors have been employed for such purposes but have been relatively unsuccessful due to the problem of either carrying the bales to the desired area or moving the conveyor several times during the conveying operation.

It is the primary object of the present invention to provide a conveyor mounted longitudinally in the barn for receiving the bales of hay from the conventional farm conveyor and subsequently moving the bales longitudinally and discharging the same laterally with the conveyor being reversible for discharging the bales from either end of the longitudinally arranged conveyor and with there being deflecting means for discharging the bales to either lateral side of the longitudinal conveyor and with the longitudinal conveyor further being longitudinally movable for orientating the conveyor in different relations to the barn for effectively completely filling the hay storage area with the bales being discharged into the desired position without subsequent rehandling of the bales.

Another very important object of the present invention is to provide a conveyor in accordance with the preceding object having control means and ropes accessible from the floor of the barn thereby enabling the direction of the movement of the bales on the conveyor to be controlled as is the position of the conveyor itself and the position of the lateral deflector arrangement for the conveyor.

Still another object of the present invention is to provide a conveyor in accordance with the preceding objects having a conveyor belt that may be employed for conveying various materials such as hay bales, pellets, chopped hay and even materials such as corn, oats, grains or the like inasmuch as a belt-type conveyor is used which will also convey chaff and other small materials.

Another feature of the present invention is to provide a conveyor of the character described that is substantially one-half the length of the barn thus enabling the conveyor to be moved longitudinally as the barn is filled so that the entire barn may be filled.

Other important objects of the present invention will reside in simplicity of construction, efficiency of operation, adjustability and adaptation for various uses together with its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIGURE 1 is a schematic end elevational view of a barn and the conveyor of the present invention mounted therein together with a farm elevator conveyor associated therewith which does not form any part of the invention except in its association with the conveyor of the present invention;

FIGURE 2 is a side elevational view of the conveyor of the present invention;

FIGURE 3 is a plan view of the present invention taken substantially upon section line 3—3 of FIGURE 2 illustrating the conveyor belt assembly and the relationship of the deflector plates at each end thereof;

FIGURE 4 is an enlarged end elevational view of the conveyor illustrating the manner of mounting the conveyor and with parts broken away illustrating the details of the latch mechanism for retaining the deflector plates in adjusted position;

FIGURE 5 is an enlarged side elevation of one end of the conveyor with the deflector plate and the supporting structure thereof being shown in section;

FIGURE 6 is a transverse sectional view taken substantially upon a plane passing along section line 6—6 of FIGURE 2 illustrating the construction of the conveyor and the drive mechanism therefor;

FIGURE 7 is a detail schematic view illustrating the drive motor and mechanism for driving the velt conveyor;

FIGURE 8 is a transverse sectional view taken substantially upon a plane passing along section line 8—8 of FIGURE 2 illustrating further structural details of the conveyor;

FIGURE 9 is a side elevational view illustrating the manner of retaining tension on the conveyor belt; and FIGURE 10 is a detail sectional view illustrating the mechanism of the latch for retaining the deflector plate in angulated position.

Referring now specifically to the drawings, the numeral 10 generally designates the conveyor of the present invention which is illustrated as being mounted longitudinally in a barn structure generally designated by the numeral 12 and which is illustrated schematically. There is also schematically illustrated a conventional farm conveyor generally designated by numeral 14 which is commonly known as a grain elevator and is normally equipped with a hopper 16 and supporting braces or struts 18 with wheels 20 thereon together with a powered conveyor belt that its usually provided with slats for carrying grain or similar material.

The conveyor 14 is associated with the barn 12 in such a manner that the upper end thereof extends into a suitable opening provided in the roof of the barn such as into a dormer structure generally designated by numeral 22 for discharging hay bales 24 onto the conveyor 10. The dormer structure 22 may be disposed substantially in the center of the barn or storage area for the material being conveyed.

The conveyor 10 of the present invention includes three inverted U-shaped yokes 26 having an upwardly extending support member 28 at the center thereof with the upper end of the support member 28 having a transverse axle 30, with wheels 32 journalled thereon. The wheels 32 rollingly engage the inturned flanges 34 on an inverted channel-shaped member 36 whereby the yokes 26 may be moved longitudinally of the barn 12. The channel-shaped member 36 and the flanges 34 form a conventional trackway that is supported adjacent the ridge pole of the roof structure by any suitable fastening means and by transverse support members 38, if necessary.

Rigidly secured to the bottom ends of the yokes 26 is a pair of spaced parallel rigid side rails 40 and 42.

Journalled in the side rails 40 and 42 is a plurality of rollers 44 all of which lie in the same horizontal plane and all of which are parallel to each other and which support an upper run of an elongated endless conveyor belt 46. The conveyor belt 46 extends substantially to the side rails 40 and 42 and the rollers 44 form a support for the upper run of the belt 46 for carrying the hay bales therealong.

A pair of side plates or guide plates 48 and 50 are supported in vertically spaced relation to the side rails 40 and 42 and are secured rigidly in relation to the side rails by upstanding support straps or members 52. One end roller 44 has an extending shaft 54 journalled in the side rail 40 with the shaft 54 having a pulley 56 for receiving a V-belt 58 driven from a drive pulley 60 supported on the output shaft of a reversible electric motor 62. The motor 62 is supported by inclined bracket members 64 whereby the reversible motor 62 may drive the conveyor belt 46 in either direction and the motor 62 is provided with an electrical conductor and a reverse switch both extending to the floor level for controlling operation of the motor and the conveyor belt 46.

At the other end of the rails 40 and 42, there is provided a longitudinal slot 66 permitting longitudinal movement of the shaft of the end roller 44 with there being a spring 68 urging the end roller longitudinally outwardly thereby retaining a predetermined tension upon the belt 46. Other belt tightening arrangements may be employed if desired of a positive nature such as the provision of a bearing block for the axle which supports the end roller 44 with there being screw-threaded elements engaging the bearing block for moving it longitudinally thereby positively adjusting the tension in the belt 46.

Disposed below the lower run of the belt 46 is a pair of idler rollers 70 supported by depending brackets 72 rigid with the side rails 40 and 42 and the rollers 70 engage and support the lower run of the belt 46 thus retaining it generally in close proximity to the lower surface of the rollers 44 and the lower tangential surface of certain of the rollers 44 may engage the lower run of the belt 46 and aid in moving the belt 46 in a linear manner.

Mounted on each end of the conveyor is a deflector assembly generally designated by numeral 74 with the deflector assembly being identical on each end.

The deflector assembly includes a pair of longitudinally spaced depending brackets 76 having a longitudinally extending rod 78 rigidly secured thereto. The brackets 76 are of V-shaped construction with there being a depending mounting member or hanger 80 at the lower end thereof which mounting member 80 is connected directly to the horizontal shaft 78 and extends vertically therefrom. There are two mounting members 80 with each mounting member 80 being connected to a bracket 76 as by welding or the like and the brackets 76 are rigidly secured to the side rails 40 and 42.

Rotatably and slidably mounted on the rod 78 is an elongated tubular sleeve 82 having a longitudinal slit or slot 84 extending from the inner end thereof to a point adjacent the center. Rigidly affixed to the outer end portion of the sleeve 82 is an enlarged rectangular plate 86 which has the inner edge thereof terminating at the end of the slot 84 and which has the outer edge upturned, as indicated by numeral 88. Thus, the plate 86 may rotate about the axis of the rod 78 and may also be moved longitudinally thereon for moving the plate 86 longitudinally to the end roller 44. When the sleeve 82 is moved inwardly and the slot 84 is registered with the depending support members 80, the inner edge of the plate 86 may be engaged with the outermost depending support member 80 thus permitting the plate 86 to be completely disposed underneath of the end roller 44 substantially as illustrated in dotted line condition in FIGURE 2 so that bales will drop straight down off of the end roller of the conveyor.

When it is desired to have the hay bales deflected to either side, the sleeve 82 and plate 86 are moved longitudinally outwardly in relation to the rod 78 with such longitudinal movement being limited by a flexible chain 90 connected to the inner end of the sleeve 82 and to the inner bracket or support member 80. In the extended position, the deflector plate 86 will receive the bales of hay from the conveyor belt and discharge them laterally in one direction or the other depending upon the angular position of the deflector plate 86.

For retaining the deflector plate 86 in either of its angular positions, there is provided a pair of longitudinally and laterally extending brackets 92 each having a downturned and outwardly extending end portion 94 provided with an aperture 96. The brackets 92 are rigidly affixed to the side rails 40 and 42 as by welding or the like and are offset sufficiently to avoid interference with the end rollers 44 and the drive mechanism at one end of the conveyor.

The deflector plate 86 is provided with an aperture 98 adjacent each outer end thereof with the apertures 98 being arranged in such a manner that they will receive the downturned end portion 94 of the bracket 92 in such a manner that the opening 96 will be disposed below the deflector plate 86. Also mounted on the undersurface of the deflector plate 86 is a tubular member 100 having a plunger type latch 102 slidably mounted therein and extending below and in intersecting relation to the opening 98. The inner end of the latch 102 is provided with an offset arm 104 extending through a slot 106 in the tubular member 100. The arm 104 is connected to a flexible line such as a rope 108 so that the latch 102 may be retracted against the spring bias of the compression spring 110 which extends between the end of the tubular member 100 and a flange 112 on the latch plunger 102. The latch plunger 102 is provided with an inclined cam surface 114 thereon so that when the deflector plate 86 is swung to an inclined position, the cam surface 114 will engage the free end of the end portion 94 and be forced inwardly and subsequently spring into the opening 96 substantially in the nature of a door latch element thereby automatically latching the deflector plate 86 in angulated position. This orientation of components is shown in FIGURES 4 and 10 and the flexible rope 108 extends to the floor surface of the barn and may be operated from the floor surface whereby the incline of the deflector plate 86 and the orientation of the flexible line 108 is sufficient that a pull on the line 108 will withdraw the plunger 102 that is engaged with the inclined end portion 94 of the bracket 92 thus releasing the same and permitting the angle of the deflector plate to be changed to its other position or to a horizontal position at which time the two flexible lines 108 may be manipulated for pulling the deflector plate back under the end of the conveyor. The flexible lines 108 or other special ropes provided therefor may be employed for pulling the entire conveyor assembly longitudinally of the barn for orienting the conveyor in the desired relation to the barn and to the elevator conveyor 14.

By providing a conveyor that is reversible, the conveyor may only be as long as one-half of the length of the barn since the conveyor may be moved longitudinally as the barn is filled and may be reversed by reversing the direction of rotation of the drive motor by a suitable reversing switch and electrical conductor extending to the barn floor level.

With the present invention, baled hay, hay pellets, hay wafers or chopped hay may be effectively conveyed and also various small grains may be conveyed including oats, wheat, corn or the like but the device is most efficient for handling baled hay which is conveyed upwardly by the conveyor 14. The entire device is operated from the ground or floor level of the barn or other storage area thereby permitting a single setting of the conveyor 14 to completely fill the barn and by providing a conveyor substantially one-half of the length of the barn and by moving the conveyor longitudinally and reversing the direction thereof all from the floor of the barn, the entire barn may be filled. The provision of the apertures in the deflecting plate 36 will not obstruct the sliding movement of the material on the deflecting plate since the openings are relatively narrow slot-like openings so that the material will not become engaged with such openings. If the deflector plates are to be removed, this can be accomplished very easily by merely unhooking or unsnapping the chain 90 and sliding the deflector plate completely off of the rod 78. The use of a conveyor belt rather than a conveying chain enables small grain to be carried and also will enable chaff and such material to be conveyed along with the baled hay.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A conveyor adapted to be mounted longitudinally adjacent the apex of the roof of a barn comprising an elongated frame, a plurality of horizontally disposed rollers mounted on said frame, an endless conveyor belt supported by said rollers with the rollers being in driving engagement with the belt, means mounted on the frame and drivingly connected to one of said rollers for driving said belt, means connected with the frame and adapted to be mounted on the barn for supporting the frame in substantially horizontal position, said means including a trackway adapted to be connected with the barn and a plurality of supporting yokes connected with the frame and having rollers on the upper end thereof engaged with the trackway for movably supporting said frame, said drive means for said one of said rollers being reversible for reversing the direction of movement of the belt thereby discharging material from either end of the conveyor and at longitudinally adjusted positions in the barn, deflector means at each end of said frame, each of said deflector means including a deflector plate mounted below the discharge end of the conveyor and means supporting the deflector plate from the frame for longitudinal movement of the deflector plate to an operative position beneath the conveyor and for angular tilting movement of the deflector plate in relation to the end roller thereby deflecting the material discharged from the conveyor belt laterally to either side thereof or permitting straight vertical discharge of the material when the deflector plate is retracted under the conveyor, said means supporting the deflector plate including an elongated horizontally disposed mounting rod suspended below the end portion of the conveyor and extending longitudinally thereof, a tubular sleeve slidable and rotatable on said rod, said rod being supported adjacent its inner end by an upstanding member extending from said frame, said sleeve having a longitudinal slot in the upper edge thereof extending for substantially one-half the length of the sleeve whereby the slot will receive the supporting member when moved inwardly on the rod thereby permitting the sleeve to be retracted, said deflector plate being rigid with said sleeve with the rear edge of the deflector plate being disposed at the inner end of the slot with the deflector plate being disposed completely under the conveyor when the sleeve is moved inwardly on the supported rod and the slot receives the support member for the rod.

2. The structure as defined in claim 1 together with a flexible chain connected to said sleeve and said support member for limiting the outward movement of the sleeve and deflector plate, said deflector plate having an upturned end edge for guiding the material laterally off of the deflector plate.

3. The structure as defined in claim 2 wherein said frame is provided with a pair of longitudinally extending brackets at each end thereof with each bracket having a downwardly and outwardly inclined apertured end portion, each end portion of each deflector plate having an opening therein receiving the respective end portions of the brackets when the deflector plate is in the extreme angular positions, and means mounted on the deflector plate for latching engagement with the aperture end portion of the bracket thereby securing the deflector plate in angular position in relation to the conveyor belt.

4. The structure as defined in claim 3 wherein said means for retaining the deflector plate in inclined position includes a spring urged plunger slidably mounted on the deflector plate for movement in perpendicular relation to the side edge of the deflector plate whereby the plunger will engage with the apertured end portion of the bracket when inserted through the aperture in the deflector plate for locking the deflector plate in position, and an elongated flexible line connected to the spring urged latch for retracting the same and for pivoting the deflector plate to a desired angular position and also for retracting or extending the deflector plate and for also pulling the conveyor longitudinally in relation to the trackway.

References Cited in the file of this patent

UNITED STATES PATENTS

| | | |
|---|---|---|
| 825,110 | Camp | July 3, 1906 |
| 923,064 | Morenus | May 25, 1909 |
| 2,639,024 | Kneer | May 19, 1953 |